(12) United States Patent
He et al.

(10) Patent No.: US 10,356,612 B2
(45) Date of Patent: Jul. 16, 2019

(54) METHOD OF AUTHENTICATING A TERMINAL BY A GATEWAY OF AN INTERNAL NETWORK PROTECTED BY AN ACCESS SECURITY ENTITY PROVIDING SECURE ACCESS

(71) Applicant: ORANGE, Paris (FR)

(72) Inventors: Ruan He, Issy les Moulineaux (FR); Jamil Chawki, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/898,100

(22) PCT Filed: Jun. 13, 2014

(86) PCT No.: PCT/FR2014/051462
§ 371 (c)(1),
(2) Date: Dec. 11, 2015

(87) PCT Pub. No.: WO2014/199102
PCT Pub. Date: Dec. 18, 2014

(65) Prior Publication Data
US 2016/0142914 A1    May 19, 2016

(30) Foreign Application Priority Data

Jun. 14, 2013  (FR) ..................... 13 55595

(51) Int. Cl.
*H04W 12/06* (2009.01)
*H04L 29/08* (2006.01)
*H04L 29/06* (2006.01)

(52) U.S. Cl.
CPC ......... *H04W 12/06* (2013.01); *H04L 63/0281* (2013.01); *H04L 63/08* (2013.01);
(Continued)

(58) Field of Classification Search
CPC .... H04W 12/06; H04L 63/0281; H04L 63/08; H04L 63/0884
See application file for complete search history.

(56) References Cited

U.S. PATENT DOCUMENTS

| 2003/0056092 | A1* | 3/2003 | Edgett | G06F 21/31 |
| | | | | 713/153 |
| 2010/0024009 | A1* | 1/2010 | Comay | H04L 63/20 |
| | | | | 726/4 |

(Continued)

FOREIGN PATENT DOCUMENTS

| EP | 1 049 036 | A2 | 11/2000 |
| EP | 1049036 | A2 * | 11/2000 | ............. G06Q 20/10 |

OTHER PUBLICATIONS

Lomotey, et al. Mar. 25, 2013. Middleware-layer for authenticating mobile consumers of Amazon S3 data. *2013 IEEE International Conference on Cloud Engineering (IC2E)*, pp. 108-113.
(Continued)

*Primary Examiner* — Carl G Colin
*Assistant Examiner* — Vance M Little
(74) *Attorney, Agent, or Firm* — Knobbe, Martens, Olson & Bear, LLP

(57) ABSTRACT

One embodiment is an authentication method comprising on receiving a request from the web browser of the terminal, the request including a user identifier, obtaining authentication data that is associated with the user identifier and that is stored in a database of the internal network, configuring a proxy server authorizing access via the access security entity to the internal network for a determined set of connection parameters, generating a first application from the connection parameters of the set, which application is protected using at least one determined portion of the authentication data and being configured to, on being executed by the web browser, set up a connection between the terminal and the
(Continued)

proxy server using the parameters, this being done in response to the at least determined portion of the authentication data being supplied and transmitting the first application to the web browser of the terminal.

24 Claims, 4 Drawing Sheets

(52) U.S. Cl.
CPC .......... *H04L 63/0884* (2013.01); *H04L 67/02* (2013.01); *H04L 67/34* (2013.01); *H04L 63/029* (2013.01); *H04L 63/067* (2013.01); *H04L 63/0838* (2013.01)

(56) References Cited

U.S. PATENT DOCUMENTS

| | | | |
|---|---|---|---|
| 2012/0151211 A1* | 6/2012 | Kreiner | H04L 63/102 713/168 |
| 2013/0133086 A1* | 5/2013 | Liberman | G09C 5/00 726/28 |

OTHER PUBLICATIONS

International Search Report dated Aug. 19, 2014 for International Application No. PCT/FR2014/051462 filed Jun. 13, 2014, 7 pages.
International Search Report and Written Opinion dated Aug. 19, 2014 for International Application No. PCT/FR2014/051462 filed Jun. 13, 2014, 12 pages.

* cited by examiner

US 10,356,612 B2

METHOD OF AUTHENTICATING A TERMINAL BY A GATEWAY OF AN INTERNAL NETWORK PROTECTED BY AN ACCESS SECURITY ENTITY PROVIDING SECURE ACCESS

RELATED APPLICATIONS

This application is the U.S. National Phase of Application No. PCT/FR2014/051462 entitled "METHOD FOR AUTHENTICATING A TERMINAL BY A GATEWAY OF AN INTERNAL NETWORK PROTECTED BY AN ENTITY PROVIDING SECURE ACCESS" filed Jun. 13, 2014, which designated the United States, and which claims the benefit of French Application No. 1355595 filed Jun. 14, 2013.

BACKGROUND OF THE INVENTION

The invention relates to the general field of telecommunications.

It relates more particularly to a technique that provides secure management of access to a service offered by a service provider for a terminal of a user registered with a so-called "internal" network that is secure (i.e. protected by an entity for providing secure access to the network), when that terminal and/or the provider of the service the terminal is attempting to reach is/are located in a so-called "external" network that is distinct from the internal network, and that is potentially not secure.

By way of example, the secure internal network may be a private business network that is protected by a firewall. No limitation is put on the location of the secure network. Thus, the secure internal network could be externalized, typically in a so-called computer "cloud".

The invention thus applies in advantageous but non-limiting manner to the context of the software-as-a-service (SaaS) model or the infrastructure-as-a-service (IaaS) model.

The SaaS and IaaS solutions are presently undergoing strong growth and they are being developed mainly for use by businesses. These solutions rely on a service provision model that enables businesses to externalize some or all of their information systems. The model also makes it possible for a client or an application that is associated with (i.e. attached to) a business to have easy access to a plurality of internal services (e.g. electronic messaging or video) or services that are external to the business (downloading files or videos, computer virtualization platform), with this being possible at any time and from any terminal.

In this context, it is important to provide effective control of access by the client or of the application attached to the business firstly to the business network and secondly to the service.

When a client attached to a business (e.g. an employee of the business) seeks to access a service authorized by the business via the business's network, solutions are presently available for controlling that access effectively providing the client's terminal is directly connected to the business network. By way of example, such solutions rely on using protocols for authenticating the terminal such as the lightweight directory access protocol (LDAP), the security assertion markup language (SAML2.0), or indeed Kerberos, followed by authorization protocols that make it possible to verify that the terminal is indeed authorized to access the requested service. Those various protocols generally make provision for interrogating a service database maintained in the business network (referred to as a "service directory") that lists all of the user accounts of the business together with the attributes associated with those users in terms of rights to access the internal or external services that are made available (i.e. authorized) by the business.

Nevertheless, the ever-increasing success and popularity of mobile and/or portable terminals are nowadays making situations more and more frequent in which a client attached to the business seeks to access an internal or external service that is authorized by the business via a wireless telecommunications network such as for example a mobile network, a wireless local area network (WLAN), or a wireless fidelity (WiFi) network that is external to the business network. Such a situation typically occurs when an employee of a business seeks to work remotely, e.g. at home, by making a connection to the secure network of the business (a situation known as "telecommuting").

Such a situation can also be encountered when an employee of a business seeks to access a service that is authorized by the business, while using an account registered with the service provider in the name of the business (e.g. with an identifier and a password specific to the business and not properly speaking to the employee).

The wireless telecommunications network used by the client or employee terminal for connecting to the internal network of the business and/or for accessing the services authorized by the business is considered as being essentially "non-secure" compared with the internal network of the business, in particular because it is not managed by the business.

Furthermore, on the wireless telecommunications network, the client's terminal may be subjected to attack without its user being aware of them by means of one or more malicious applications that may in particular be seeking to compromise the integrity and the operation of the business network when the terminal accesses it, or to usurp the identifier and the associated password, where appropriate, to the business's account with the service provider(s), and sent by the client via the terminal when attempting to access the service(s) offered by the provider(s).

Solutions exist in the state of the art that propose setting up a secure virtual tunnel between the client's terminal and the business network, in order to enable the terminal to connect to the business network and use the services that it authorizes via a non-secure network and without compromising the security of the business network. Such solutions are also known as virtual private networks (VPNs).

Nevertheless, those solutions are relatively cumbersome for the client in terms of use since they require the client to perform numerous actions such as installing and running a dedicated application on the client's terminal, inputting authentication data that might possibly be synchronized by using a security token, etc., and necessarily requiring the terminal to access the service(s) via the secure tunnel once it has been set up, which can make such access slower.

OBJECT AND SUMMARY OF THE INVENTION

The invention makes it possible in particular to mitigate these drawbacks by proposing an authentication method enabling a gateway of an "internal" network that is protected by an access security entity for securing access to authenticate a terminal provided with a web browser, the method comprising:
  on receiving a request coming from the web browser of the terminal and including a user identifier, an obtaining step of obtaining authentication data that is associated with the user identifier and that is stored in a database of the internal network;

a configuration step of configuring a proxy server authorizing a determined set of connection parameters to access said internal network via the access security entity;

a generation step of generating a first application from parameters of the determined set of connection parameters, said first application being protected using at least one determined portion of the authentication data and being suitable, on being executed by the web browser of the terminal, for setting up a connection between the terminal and the proxy server by using the parameters, in response to said at least one determined portion of the authentication data being supplied; and a transmission step of transmitting the first application to the web browser of the terminal.

Correspondingly, the invention also provides a gateway of an "internal" network protected by an access security entity for providing secure access, the gateway comprising:

an obtaining module that is activated on receiving a request coming from a web browser of a terminal and including a user identifier, the obtaining module being suitable for obtaining authentication data that is associated with the user identifier and that is stored in a database of the internal network;

a configuration module for configuring a proxy server allowing a determined set of connection parameters access to the internal network via the access security entity;

a generation module suitable for generating a first application from parameters of the determined set of connection parameters, the first application being protected by using at least one determined portion of the authentication data and being suitable, on being executed by the web browser of the terminal, for setting up a connection between the terminal and the proxy server by using the parameters, in response to said at least one determined portion of the authentication data being supplied; and a transmission module for transmitting the first application to the web browser of the terminal.

By means of this authentication method and this gateway, the invention makes it possible for a user having an account registered with a secure internal network to make use of that user's own terminal in order to benefit from services that are made available by the internal network, with this being possible even when the terminal is outside the security perimeter defined by the internal network (in other words even when the terminal is connected to an external network that is not secure). This may be accomplished by the user without threatening the integrity of the internal network, and in a manner that is relatively easy by means of a web browser in the terminal.

The authentication proposed by the invention relies advantageously on authentication information stored in the user database (also known as the "service directory") that is maintained by the internal network, and that lists the accounts of the various users registered with the internal network.

More precisely, the authentication method relies on two main elements, namely:

firstly (automatically) configuring a proxy server that is upstream from or at the same level as the access security entity that protects the internal network, this configuration making it possible to open access to the internal network for the authenticated terminal via the access security entity (in other words, requests coming from the authenticated terminal are given access to the internal network and correspondingly requests made to that terminal are allowed to leave the internal network); and secondly on an application personalized for the terminal, or more generally for the user identifier (the "first" application in the meaning of the invention), which application is generated and transmitted to the web browser of the terminal and enables it to be authenticated with the internal network. This application is generated so as to trigger the setting up of a connection between the terminal and the proxy server when the application is executed by the browser of the terminal and after the user has used the terminal to supply a determined portion of the authentication data associated with the user's identifier within the internal network. The application verifying the authentication data supplied by the terminal enables the terminal to be authenticated. The connection that may then be set up may advantageously be made secure using conventional mechanisms.

It should be observed that an application in the meaning of the invention is a program or software including parameters and/or scripts suitable for being executed by a web browser and suitable for dynamically triggering, in response to such execution, various actions as defined by these parameters and/or scripts. By way of example, the application may be generated in the JavaScript® language. Thus, the web browser of the terminal (or more generally any web browser) executing the first application of the invention serves, when the data supplied by the user to the first application matches the portion of the authentication data used for protecting it, to set up a (secure) connection dynamically between the terminal and the internal network, and more specifically with the proxy server, which then serves to route messages coming from the authenticated terminal to entities of the internal network suitable for processing such requests.

Such a software application is considered as being active in the sense that it contains one or more scripts for executing on the web browser to which the application has been downloaded (or in equivalent manner the web browser to which the application is transmitted). In this sense, it is in contrast to a conventional passive content file (also known as a "cookie"), that contains content elements only.

In accordance with the invention, the first application is personalized for the terminal.

It serves to open up a connection for that terminal to the internal network via the access security entity, once the terminal has been validly authenticated.

More precisely, by configuring the proxy server, access to the internal network is opened up via the access security entity for any communication relying on a determined set of connection parameters (or in equivalent manner characteristics), such as for example an Internet protocol (IP) address, an access port, a user identifier, encryption algorithms, or communication protocols, etc.

This set of connection parameters or characteristics may advantageously be reserved to the first application, i.e. it is for use by that application only. It is incorporated in full or in part in the first application so that the connection set up by the first application between the terminal and the proxy server once the terminal has been authenticated makes use of connection parameters that are authorized to access the internal network via the access security entity. The connection as set up in this way enables the terminal subsequently to request access to services that are managed by the internal network, which services may possibly be made available by platforms that are external to the internal network.

Furthermore, the first application is protected with authentication data associated in the internal network with the user identifier transmitted by the terminal. This protection makes it possible for the terminal to be authenticated, properly speaking, thus guaranteeing that access to the internal network is opened up to the terminal (by using the connection parameters that were used while configuring the proxy server) only if the data supplied by the user of the terminal to the web browser matches the authentication data associated with the user identifier in the database of the internal network, or at least matches the determined portion of that authentication data that is used for protecting the first application. Otherwise, the first application does not set up any connection with the internal network for the terminal. In other words, access to the internal network for the terminal is rejected and impossible.

Generating a first application as specified by the invention, which application is both protected using authentication data of the user and executable by the web browser of the terminal, provides the operator of the internal network with great flexibility in setting the parameters of the access that is made available to the terminal. It is easy for the operator to program the application so that it incorporates the attributes of the access policy that the operator seeks to apply (e.g. secure connection, using particular data encryption procedures, encryption parameters, etc.).

Furthermore, the fact that the first application can be executed by the web browser of the terminal of this first application improves the experience of the user compared with the state of the art for authenticating and accessing the internal network in secure manner. The user needs only to interact with the web browser on the terminal.

Furthermore, the programming of the first application enables it to apply protection that can be modulated as a function of the looked-for level of security, while involving relatively little complexity.

Thus, in a particular implementation, during the step of generating the first application, said at least one portion of the authentication data used for protecting the first application is determined in random manner.

This acts dynamically to strengthen the security of access to the internal network and in particular its ability to withstand attacks by malicious users or applications. Specifically, by changing randomly the portion of the authentication data used for the purpose of protecting the first application and correspondingly for authenticating the terminal, it becomes quite impossible in practice for a malicious user or application to deduce which portion of the authentication data is required in order to be able to set up a connection to the internal network, even if the malicious user or application has already intercepted applications generated by the gateway on numerous occasions.

In another implementation, the first application as generated during the generation step includes said at least one determined portion of the authenticated data in protected form.

For example, the said protected form adopted in the first application may comprise a digital fingerprint (or hash) of said at least one determined portion of the authentication data, which fingerprint is generated using a hashing function. Advantageously, in a manner known to the person skilled in the art such a function presents properties that are advantageous in terms of withstanding collisions (i.e. it is very difficult to find two identical messages leading to the same digital fingerprint) and of withstanding attacks (i.e. it is difficult to determine the content of a message from its digital fingerprint, and it is difficult from a message and its digital fingerprint to generate another message having the same fingerprint).

Thus, the first application does not contain the authentication data used for protecting and setting up the connection, as such, i.e. in non-protected raw form, or in equivalent manner as defined in the database of the internal network. As a result, it is ensured that the authentication data (or more precisely the determined portion of the authentication data) is not available in clear in the first application. Consequently, in the event of the application being intercepted by a malicious entity, it is very difficult for that entity, in particular when the authentication data is present in the first application only in the form of a digital fingerprint, to reconstitute the authentication data associated with the identifier of the user in the internal network, and thus to misappropriate use of the user's account in the network.

As mentioned above, the generation of a first application suitable for executing in a web browser, as provided by the invention, provides flexibility concerning the functions that can be incorporated in the application.

In particular, it is thus possible to envisage an implementation in which the first application is generated in such a manner that triggers deletion of the first application from the browser of the terminal in the event of terminal authentication data that does not correspond to said at least one determined portion of the authentication data used for protecting the first application being supplied in succession some predetermined number of times.

As a result, in the event of a failure of the terminal to be authenticated, it is ensured that no connection is set up with the internal network. Attacks are also avoided that might be undertaken on the information stored in the first application, and more precisely attacks undertaken on the fingerprint when the authentication data is protected and stored in the first application in the form of a digital fingerprint.

Naturally, other protection mechanisms may be considered by way of variant, as an alternative, or in addition to the above-mentioned mechanisms. In particular, it is possible to envisage other procedures for preventing the first application setting up the connection between the terminal and the proxy server, and/or for refusing connection.

As mentioned above, the invention advantageously proposes providing a terminal with access to an internal network in secure and flexible manner via authentication of the terminal that is performed using a first application that can be executed in the terminal's web browser.

In a particular implementation of the invention, the authentication may be followed by an authorization procedure seeking to enable the terminal to access services that are authorized by the internal network and that are offered by service platforms that are external to the internal network. In other words, in this particular implementation, the invention also makes it possible to supervise any access made by the terminal using the secure internal network to external services that are offered by networks that are not secure.

More precisely, the invention also provides an authorization method enabling a gateway of an "internal" network protected by a security entity to authorize a terminal having a web browser to access a service made available by a service platform of an "external" network distinct from the internal network, the method comprising:
    an authentication step of the gateway authenticating the terminal by executing an authentication method of the invention;

if the terminal is authorized to access the service by an access management server of the internal network, a generation step of generating a second application suitable, on being executed by the web browser of the terminal, for supplying a direct connection between the terminal and the service platform for accessing the service; and a transmission step of transmitting the second application to the web browser of the terminal.

Correspondingly, in this implementation, the gateway of the internal network further comprises:

a generation module for generating a second application that is activated if the terminal is authorized by an access management server of the internal network to access a service made available by a service platform of an "external" network distinct from the internal network, said second application being suitable, on being executed by the web browser of the terminal, for supplying a direct connection between the terminal and said service platform in order to access said service; and a transmission module suitable for transmitting said second application to the web browser of the terminal.

This implementation thus relates to simple management of providing the authenticated terminal with authorization proper to access a service that is made available by a network that is external to the secure internal network, and is additional to the above-described authentication procedure. It provides for generating a second application that is active for execution in the terminal's web browser in order to make such access possible. By way of example, the second application is a connector between the network of the terminal and the network in which the service platform is to be found, of conventional type. The connection as set up in this way may be made secure, e.g. by setting up a VPN type tunnel.

By way of example, the second application is generated in the JavaScript® language, like the first application. The invention thus makes it possible to group together among web applications that are developed in JavaScript® language, the authentication and authorization functions that are needed for guaranteeing secure access to the (external) network hosting the service from the (external) network of the terminal, with this taking place via the secure internal network.

It should be observed that, advantageously, the connection set up by the second application between the service platform and the terminal is a direct connection, in other words it does not pass via the secure internal network. This avoids slowing down access to the service as could result from communications exchanged between the terminal and the service platform passing via the internal network while this service is being provided, as can happen in the state of the art.

In other words, in accordance with the invention, the authentication of the terminal and the authorization of the terminal to access a service made available by the service provider are both managed by the secure internal network, but a direct link is then established between the network of the terminal and the network of the service provider in order to provide access proper for the terminal to the service that is made available by the service provider.

Nevertheless, this direct link continues to be secure and controlled by the secure internal network since it is triggered and configured by the gateway of the internal network. Consequently, and as mentioned above, the gateway can take advantage of the flexibility made available by programming such an application to include various security parameters therein.

Thus, by way of example, in a particular implementation, the second application includes a security parameter previously exchanged between the service platform and an entity of the internal network for accessing the service, the second application being suitable for supplying the security parameter to the service platform on setting up the direct connection between the terminal and the service platform.

By way of example, such a security parameter is a security token exchanged between the service platform and the operator (i.e. the proprietor) of the internal network when creating an account with that service platform in the name of the operator. Advantageously, the token does not contain the authentication data as such that is associated with the operator's account with the service provider, i.e. it does not contain the data in raw form.

This implementation thus enables the user of the terminal to access the service made available by the service platform by using the parameters of the account of the internal network operator (e.g. for an employee of a business, by using the parameters of the account in the name of the employer that has been opened with the service provider), but without requiring the terminal to send (or even know) the operator's authentication data.

In other words, the invention advantageously enables the user of a terminal connected to any network (possibly a non-secure network) to have the same facilities and the same services as if the user were directly connected to the secure internal network, firstly while preserving the integrity and the security of the internal network (by performing the authentication procedure and the authorization procedure, if any), and secondly without requiring the user to carry out interactions and/or operations that are complex. The operator of the internal network can thus keep control over access to the service by the terminal, while facilitating the experience of the user.

As can be seen from reading this description, the invention relies not only on the gateway of the internal network managing the applications that are transmitted to the web browser of the terminal, together with the steps of the authentication and authorization methods implemented by the gateway, but also on the web browser itself of the terminal that executes these applications (the first application, and where appropriate the second application) that it has received from the gateway, thus enabling the user of the terminal to access services made available by non-secure external networks via the internal network in secure manner.

Thus, in another aspect, the invention also provides a connection set-up method for setting up a connection with an "internal" network protected by an access security entity for providing secure access, the method being for performing by a web browser of the terminal and comprising:

after the web browser has sent a request including a user identity to a gateway of the internal network, a reception step of receiving from the gateway a first application that is protected using at least one determined portion of authentication data associated with the user identifier in a database of the internal network; and an execution step of executing the first application, the execution step comprising:

the first application obtaining authentication data from the terminal; and if the authentication data obtained from the terminal corresponds to said at least one determined portion of the authentication data protecting the first application, the first application setting up a connection between the terminal and a proxy server associated with the internal network, the connection using parameters from a set of connection parameters authorized by the proxy server for accessing the internal network via the access security entity.

Correspondingly, the invention also provides a web browser for installing on a terminal, the web browser comprising:

a reception module that is activated as a result of the web browser sending a request including a user identifier to a gateway of an "internal" network that is protected by an access security entity, the reception module being suitable for receiving from the gateway a first application that is protected by at least one determined portion of authentication data associated with the user identifier in a database of the internal network; and an execution module suitable for executing the first application, the first application comprising:
  a first unit configured to obtain authentication data from the terminal; and
  a second unit configured to set up a connection between the terminal and a proxy server associated with the internal network if the authentication data from the terminal as obtained by the first unit corresponds to said at least one determined portion of the authentication data protecting the first application, the connection using parameters of a set of connection parameters authorized by the proxy server for accessing the internal network via the access security entity;

these units being activated during execution of the first application.

The invention also provides an access method enabling a terminal having a web browser to access a service offered by a service platform of an "external" network, the method comprising:

an execution step of the web browser of the terminal executing a method of the invention resulting in the terminal being authenticated with an "internal" network protected by an access security entity, by means of a first application transmitted to the web browser by a gateway of the internal network, and in the first application setting up a connection between the terminal and a proxy server associated with the internal network, the connection making use of a set of connection parameters authorized by the proxy server for accessing the internal network via the access security entity;

a send step of the first application sending a request to the proxy server via the connection, the request being for access to the service made available by the service platform;

if the terminal is authorized to access the service, a reception step of the web browser receiving a second application generated by the gateway; and an execution step of the web browser executing the second application, thereby supplying the terminal with a direct connection to the service platform to access the service.

Correspondingly, in a particular implementation, the first application transmitted to the web browser of the terminal further comprises a third unit configured to send a request to the proxy server via the connection that has been set up, the request being for access to a service made available by a service platform of an "external" network distinct from the internal network, the third unit being for activating during execution of the first application by the execution module, and the web browser further comprising:

a reception module suitable for receiving a second application generated by the gateway if the terminal is authorized to access the service; and an execution module suitable for executing the second application, the second application being suitable for supplying the terminal with a direct connection to the service platform in order to access the service.

In yet another aspect, the invention provides a terminal having a web browser of the invention installed thereon.

The web browser, the communication method, and the terminal benefit from advantages similar to those described above for the gateway and for the management method of the invention.

In another aspect, the invention provides a telecommunications network protected by an access security entity for providing secure access, the telecommunications network including a gateway of the invention suitable for authenticating a terminal provided with a web browser of the invention.

In a particular implementation, the telecommunications network further comprises an access management server suitable for verifying whether the terminal is authorized to access a service made available by a service platform of an "external" network distinct from the internal network.

In a particular implementation, the various steps of the authentication method and/or the authorization method and/or the connection set-up method and/or the access method are determined by computer program instructions.

Consequently, the invention also provides a computer program on a data medium, the program suitable for being performed in a gateway, a web browser, or more generally in a computer, the program including instructions adapted to performing steps of an authentication method and/or an authorization and/or a connection set-up method and/or an access method as described above.

The invention also provides a computer program on a data medium, the program being suitable for being performed in a web browser or more generally in a computer, the program including instructions adapted to performing steps of the communication method as described above.

These programs can use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In yet another aspect, the invention also provides a software application for execution on a web browser of a terminal, the application comprising:

a first unit configured to obtain authentication data from the terminal; and a second unit configured to set up a connection between the terminal and a proxy server associated with an "internal" network protected by an access security entity for providing secure access providing the authentication data from the terminal obtained by the first unit corresponds to a determined portion of security data associated with a user identifier in a database of the internal network, said determined portion being used to protect the application, the application making use of parameters from a set of connection parameters authorized by the proxy server to access the internal network via the access security entity;

the first and second units being suitable for being activated during execution of the application by the browser.

In other implementations and/or embodiments, it is also possible to envisage that the authentication method, the authorization method, the connection set-up method, the access method, the gateway, the web browser, the terminal, the software application, and the telecommunications network of the invention present in combination some or all of the above-mentioned characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
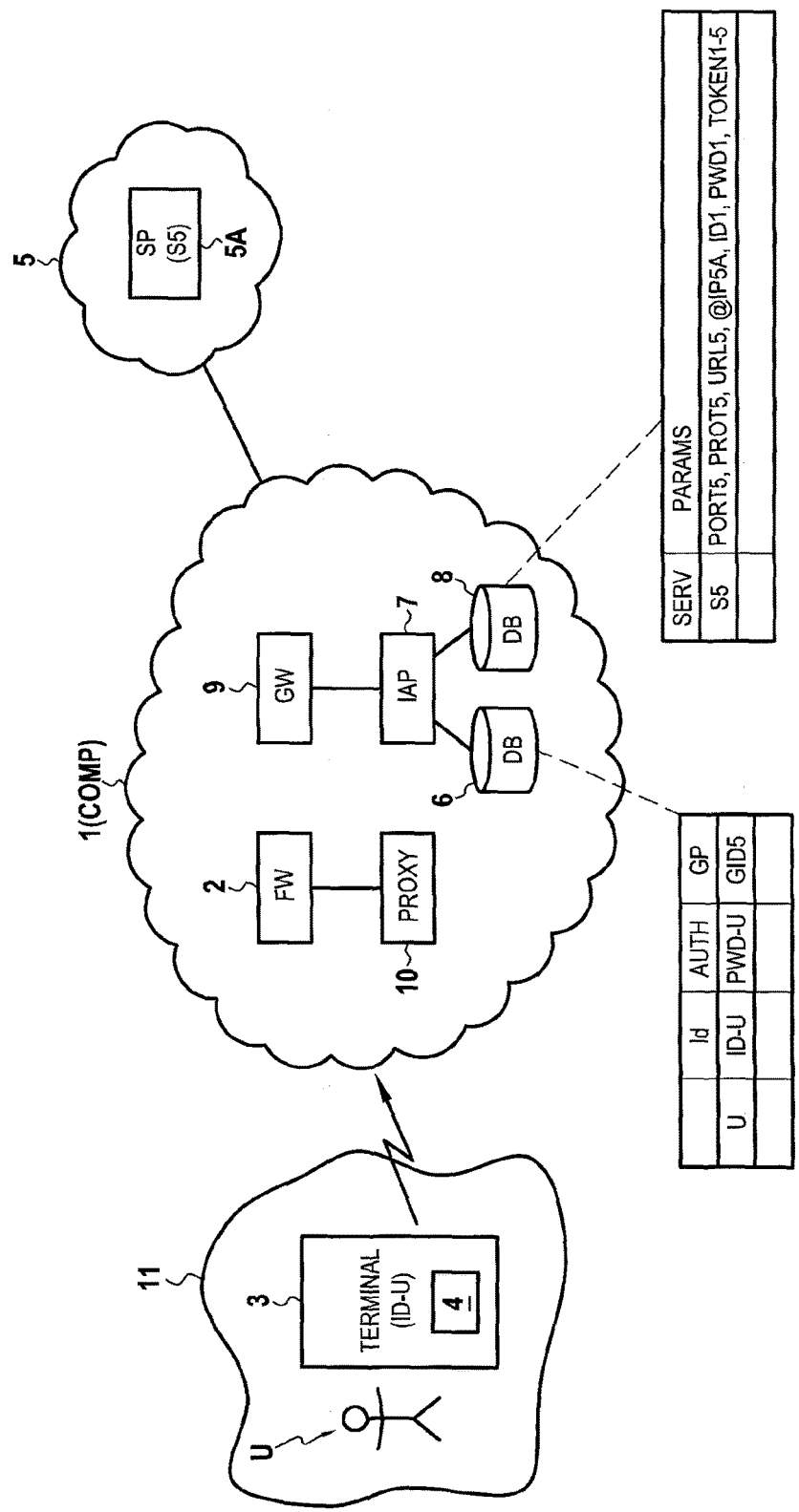
FIG. 1 is a diagram showing a telecommunications network, a gateway, and a terminal in accordance with the invention, in a particular embodiment.

FIG. 1 shows a particular embodiment of a telecommunications network 1 in accordance with the invention in its environment.

In this embodiment, the telecommunications network 1 is a secure business network (referred to as an "internal" network) that is attached to a business COMP, and that is protected by a conventional firewall 2. The firewall 2 has the function of making accesses to the network 1 secure, and for this purpose it applies an access policy as defined by the business COMP: it thus monitors traffic entering and leaving the network 1, filtering the exchanged data streams as a function of types of communication that are authorized by the business and that are defined in the form of access rules (e.g. authorized traffic types, machines authorized to communicate via the network, accessible sites, etc.). The firewall 2 is an access security entity in the meaning of the invention for protecting the network 1.

As mentioned above, the invention enables a user U of a terminal 3 having a web browser 4 to access at least one service S5 made available by a service platform 5A hosted in a network 5 that is external to the secure network 1, by using authentication and authorization procedures that are performed by the network 1. By way of example, the service S5 is an on-line service for booking airplane tickets. Naturally, no restriction is associated with the nature of the service S5.

In the presently-described implementation, the secure network 1 also proposes one or more internal services to the user U. Once the terminal 3 has been authenticated with the internal network 1, access to these internal services may be managed using various mechanisms that are known in the state of the art, and such access is not described in greater detail herein.

By way of example, the user U is an employee of the business COMP owning the network 1 (or to which the network 1 is attached), having a user account that is declared and stored in a service database 6, known as the service directory, of the network 1. In this example the database 6 is managed by an identity and access provider 7.

The account of the user U maintained in the database 6 contains a user identifier ID-U that is associated with authentication data PWD-U, such as a password, that the user U must supply in order to be authenticated with the secure network 1 on making a connection thereto.

It also contains an identifier GID5 for a group (or for a class) of users to which the user U belongs. This group comprises users of the business COMP who share identical access rights to one or more classes of service made available to the users by the business COMP. These access rights relate both to internal services made available by the network 1 and to services hosted by external networks, such as the network 5.

On the basis of such an identifier and of knowledge about access rights associated with each group of users defined by the business COMP, the identity and access provider 7 has no difficulty in deducing whether the user U is authorized to access a given service, e.g. such as the service S5.

In a variant, the account of the user U may identify explicitly and individually the services to which that user is authorized to access. No particular limitation is associated with the form taken by the access rights allocated to the user U in the database 6.

In the example shown in FIG. 1, it is assumed that the group of users identified by the identifier GID5 has the right to access the service S5 supplied by the external network 5.

Each service supplied by an external network (thus typically the service S5 supplied by the service platform 5A) is associated with access parameters to that service.

By way of example for the service S5, these parameters include an access port PORT5, a uniform resource locator (URL) address written URL5 where the service S5 is available, the IP address written @IP5A of the platform 5A, and also the communication protocol(s) PROT5 for use during such access.

In the presently-described implementation, these access parameters also include security parameters associated with a user account created with the service provider 5A in the name of the business to which the user U is attached. In this example, these security parameters include an identifier ID1 and a password PWD1 (i.e. authentication data) associated with the account of the business COMP as created with the platform 5A, together with a security token TOKEN1-5 exchanged between the business COMP and the platform 5A while creating the account (via an entity E1 of the internal network 1, not shown in FIG. 1). This security token is obtained in known manner by using a procedure for authenticating the entity E1 of the internal network 1 as performed by the service provider 5A using the identifier ID1 and the password PWD1, and it specifies the account of the business COMP in unique and secure manner. It includes a digital fingerprint generated by applying a conventional hashing function to an encrypted form of the identifier ID1, and it may be used for authentication purposes with the service platform 5A and to access the service S5 via the business's account without supplying the identifier ID1 and the password PWD1.

In this example, these access parameters are stored in an access base 8 that is maintained by the administrator of the network 1 and that the identity and access provider 7 can interrogate using conventional means.

Thus, in the presently-described implementation, the identity and access provider 7 acts as an access manager server in the meaning of the invention and is suitable firstly for verifying whether a terminal associated with a user identifier is authorized to access a determined service by consulting the service database 6, and secondly, where appropriate, for obtaining access parameters to that service by interrogating the access base 8.

In accordance with the invention, in order to manage access by the terminal 3 of the user U to the service S5 made available by the business network 1, the business network 1 includes a gateway 9 in accordance with the invention.

Figure 2:
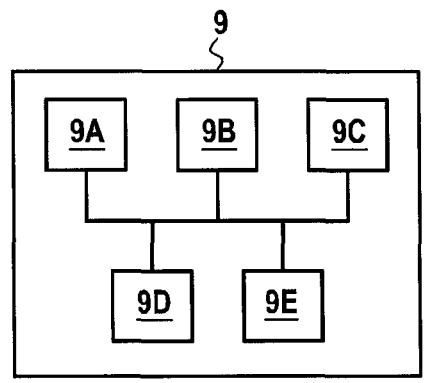
FIGS. 2 and 3 show respectively the hardware architectures of the gateway and of the terminal of FIG. 1.

In the presently-described implementation, this gateway 9 is a web server having the hardware architecture of a computer, as shown in FIG. 2.

In particular, it comprises a processor 9A, a ROM 9B, a random access memory (RAM) 9C, a non-volatile memory 9D, and communication means 9E for communicating in particular with the terminal 3, with the entities of the network 1, and with the service platform 5A of the external network 5. By way of example, these communication means 9E incorporate a conventional network card that is not described in detail herein.

The ROM 9B of the gateway 9 constitutes a data medium in accordance with the invention that is readable by the processor 9A and that stores a computer program in accordance with the invention including instructions for executing steps of an authentication method and an authorization method in accordance with the invention, the steps of these methods being described below with reference to FIGS. 4 and 5 respectively in a particular implementation.

In corresponding manner, the computer program defines functional modules of the gateway 9 that are suitable for performing these steps, and in particular it defines an obtaining module for obtaining authentication data associated with a user identifier from the service database 6, a configuration module for configuring a proxy server in order to provide the terminal 3 with access to the internal network 1 via the firewall 2, one or more generator modules for generating applications that are executable in a browser and that are suitable for enabling the terminal to set up a connection to the network 1 via the proxy server and a direct connection to the service platform 5A, a send/receive module for sending/receiving web requests and responses, and in the presently-described embodiment, an obtaining module for obtaining access parameters to the service S5. The functions of these modules are illustrated in greater detail in the description below with reference to the steps of the authentication and authorization methods.

It should be observed that in the presently-described implementation, the gateway 9 supports the hypertext markup language (HTML) and/or the hypertext transfer protocol secure (HTTPS) language, and the JavaScript® language in order to be capable of communicating with the terminal 3 and in particular with its browser 4, and of generating applications for the browser. In other words, the above-mentioned functional modules are suitable for using these languages during their interactions with the browser 4 of the terminal 3.

No limitation is associated with the type of terminal used by the user U for accessing the secure network 1, nor the network 11 via which this terminal is connected to access the service S5, nor even the service S5. Thus, the terminal 3 may be a mobile terminal, a desktop or laptop computer connected to a WiFi network, a digital tablet, a personal assistant, a smartphone, etc.

The web browser 4 installed on the terminal is in accordance with the invention. It supports HTML and the JavaScript® language and it provides an environment suitable for executing JavaScript® applications.

Figure 3:
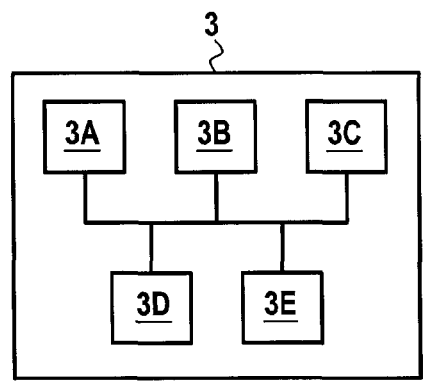

In the presently-described embodiment, the terminal 3 has the hardware architecture of a computer, as shown diagrammatically in FIG. 3.

In particular, it comprises a processor 3A, a ROM 3B, a RAM 3C, a non-volatile memory 3D, and communication means 3E for communicating in particular with the gateway 9 and the service platform 5A. By way of example, these communication means 3E incorporate a card enabling the terminal to communicate via the network 1, that is itself known and that is not described in detail herein.

The ROM 3B of the terminal constitutes a data medium in accordance with the invention that is readable by the processor 3A and that stores a computer program in accordance with the invention, including instructions for executing steps of a connection set-up method and of an access method in accordance with the invention, the steps of these methods being described below with reference to FIGS. 4 and 5 respectively, in a particular implementation.

In corresponding manner, the computer program defines functional modules of the web browser 4, and more specifically a send module for sending web requests (HTTP and/or HTTPS), and a receive module for receiving personalized JavaScript® applications coming from the gateway 9 of the network 1, and an execution module for executing these applications. The functions of these modules are described in greater detail in the description below with reference to the steps of the connection set-up method and of the access method performed by the browser 4.

Figure 4:
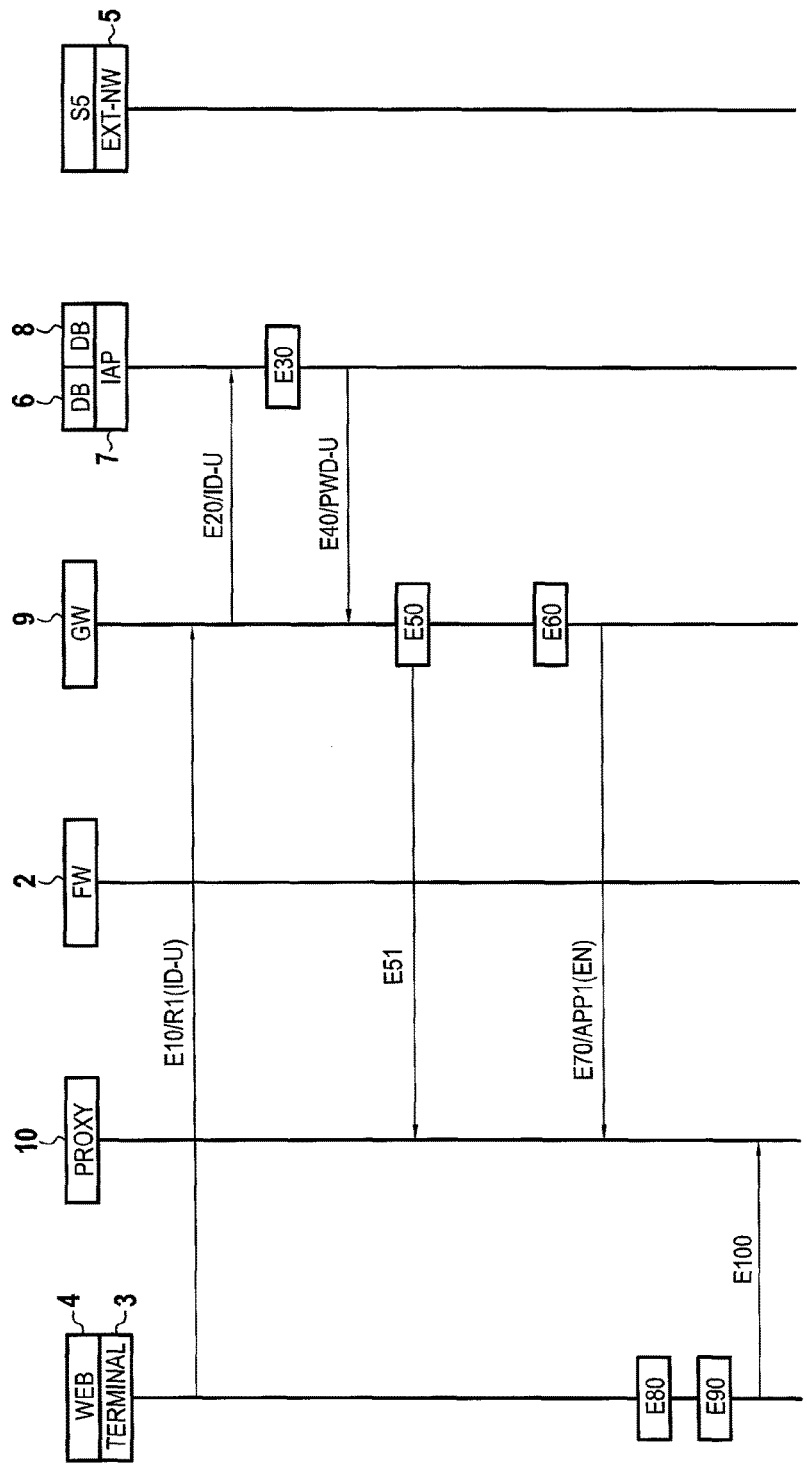
FIG. 4 shows the main steps of an authentication method, of a connection method set-up and of an access method that are performed by the gateway and by the terminal of FIG. 1 during a stage P1 of the terminal being authenticated by the telecommunications network of FIG. 1.
Figure 5:
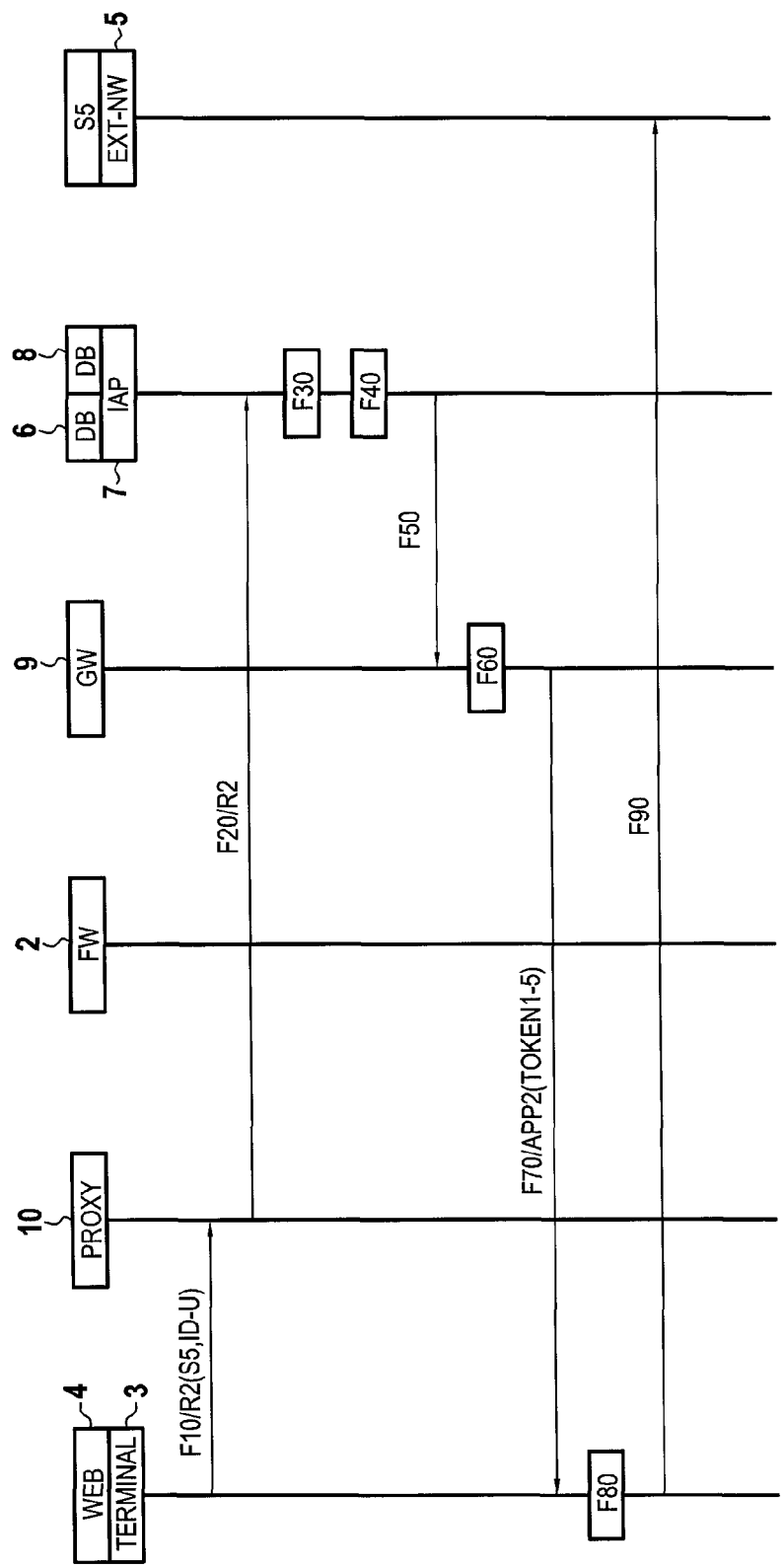
FIG. 5 shows the main steps of an authorization method and an access method performed respectively by the gateway and by the terminal of FIG. 1 during a stage P2 of authorizing access by that terminal to a service made available by a network external to the telecommunications network of FIG. 1.

With reference to FIGS. 4 and 5, there follows a description of the main steps of the authentication method and of the authorization method performed by the gateway 9, and also the main steps of the set-up method and of the access method performed by the terminal 3 and more particularly by its web browser 4 in a particular implementation setting out to supervise access by the terminal 3 to the service S5 made available by the external network 5 via the secure network 1, in particular by using user information stored in its service database 6.

In the presently-described implementation, the solution proposed by the invention takes place in two stages, namely:
an authentication first stage P1 for authentication proper of the terminal 3 of the user U, having its main steps shown in FIG. 4; and
an authorization second stage P2 for authorizing access to the service S5, having its main steps shown in FIG. 5.

Thus, with reference to FIG. 4 (stage P1), it is assumed that the user U attached to the business COMP seeks to access the service S5 via the business's network 1.

For this purpose, the user makes use of the terminal 3 via the web browser 4 to send an HTTP or HTTPS web request R1 to the gateway 9 of the secure network 1 (step E10). This request R1 contains the identifier ID-U of the user U. It is assumed that a port has already been opened on the firewall 2, in conventional manner, so as to enable the request R1 to reach the gateway 9.

After receiving this request, the gateway 9 verifies whether the user U is authorized to access the network 1, in other words whether the user has a user account associated with the identifier ID-U in the service database 6, and where appropriate it obtains the authentication data associated in the database with the identifier ID-U.

For this purpose, the gateway interrogates the identity and access provider 7 using the identifier ID-U (step E20). The provider consults the service database 6 step E30). In the presently-described example, during this consultation it determines that the user U has a user account registered in the database 6. This account is identified by the identifier ID-U and contains the authentication data PWD-U for authentication with the internal network 1.

The identity and access provider 7 supplies the authentication data PWD-U to the gateway 9 (step E40).

On obtaining this data, the gateway 9 authorizes access to the secure network 1 via the firewall 2 to a determined set PC of connection parameters (or characteristics), which set PC may, by way of example, include an access port, an IP address, the identifier ID-U used by the terminal 3, communication protocols that might be used, and where appropriate data encryption protocols, etc. (step E50). Selection proper of these connection parameters by the gateway 9 does not present any particular difficulty for the person skilled in the art and is not described in detail herein.

For this purpose, in the presently-described implementation, the gateway 9 configures (or creates) a proxy server 10 on entry to the internal network 1, upstream from the firewall 2, with the set PC of connection parameters authorized to access the internal network 1 (step E51). It should be observed that the term "configuring a proxy server upstream from the firewall" should be understood in the meaning of the invention as configuring a proxy server at the entry to the secure network 1 in series between the terminal 3 and the filtering performed by the firewall 2, such that in certain configurations the proxy server could be located within the firewall 2.

In conventional manner, the proxy server 10 thus makes it possible to open access to the network 1 via the firewall 2 for communications relying on (i.e. using) the connection parameters defined in the set PC (i.e. to messages (or requests) sent to the network or coming from the network using these connection parameters). Configuring such a server is conventional: it consists in particular in defining rules for accessing the internal network 1 via the firewall 2 from connection parameters defined in the set PC, e.g. including the terminals authorized to have access (identified by their IP addresses or by user identifiers, for example), the sites to which access is possible, etc.

Thereafter, the gateway 9 generates a JavaScript® software application APP1 that is personalized for the terminal 3 (or more specifically for the identifier ID-U used by the terminal 3) on the basis of parameters of this set PC of connection parameters (step E60). This application APP1 is active and, while being executed by the web browser 4 (or more generally by any web browser), it is suitable for setting up a connection between the terminal 3 (i.e. its browser 4) and the proxy server 10 as configured using the parameters of the set PC (e.g. access port, encryption algorithms, etc., as defined in the set PC). The application APP1 is an application in accordance with the invention.

In the presently-described implementation, the set PC of connection parameters with which the proxy server 10 is configured is reserved for (i.e. dedicated to) the application APP1. In other words, only the application APP1 can make use of such connection parameters, and they are not transmitted to any other entity by the gateway 9.

Furthermore, in the presently-described implementation, the connection provided by the application APP1 is a secure connection with the network 5. This secure connection may rely for example on deploying an encrypted communication tunnel between the terminal 3 and the proxy server 10, as defined in the set PC of connection parameters. The application APP1 thus has all of the configuration parameters for the tunnel (including the algorithms needed for this deployment, such as encryption methods, etc.).

Generating such an application does not in itself present any problem for the person skilled in the art, and it is therefore not described in detail herein.

In accordance with the invention, the gateway 9 protects the application APP1 as generated in this way by using authentication data PWD-U associated with the identifier ID-U and obtained from the service database 6.

For this purpose, in the presently-described implementation, the gateway 9 includes in the application APP1 a condition for setting up the connection between the terminal 3 and the proxy server 10. According to this condition, the secure connection is set up only if the terminal 3 supplies the application APP1 with at least a determined portion P-PWD-U of the authentication data PWD-U associated with the identifier ID-U in the service database 6, as described in greater detail below.

In this example, this portion is determined by the gateway 9 in random manner, so that for each application generated by the gateway 9, this portion may vary. Thus, by way of example, one application may be protected by the first four characters of the authentication data obtained by the gateway, another application may be protected by the last four characters, yet another application may be protected by four middle characters, etc. No limit is associated with the number of authentication data characters that are used for forming this portion P-PWD-U (it is also possible for P-PWD-U=PWD-U).

In a variant implementation, the gateway 9 always selects the same authentication data characters for forming the portion P-PWD-U.

The authentication data P-PWD-U used by the gateway 9 for protecting the application APP1 is stored in this implementation by the application APP1 in protected form.

For this purpose, the gateway 9 applies a conventional hashing function to the portion P-PWD-U so as to generate a digital fingerprint EN (or hash) of the data. The digital fingerprint EN and the hashing function are then stored in the application APP1. As a result, it is impossible from the digital fingerprint EN available in the application APP1 to recreate the authentication data portion P-PWD-U used by the gateway 9 for protecting the application APP1.

In other words, the application APP1 does not contain, at any time, the authentication data PWD-U (or the portion P-PWD-U) as such, i.e. in a raw and unprotected form (i.e. in the clear) as they may be stored for example in the service database 6, but only in a form that is protected.

The gateway 9 transmits the application APP1 as generated and protected in this way to the browser 4 of the terminal 3 (step E70).

The browser 4 executes the application APP1 that it has received (step E80).

This execution leads to sending an invitation to the user of the terminal 3 to supply the determined portion of the authentication data associated with the identifier ID-U in the network 1 and that has been used for protecting the application APP1 (e.g. the first four characters of the authentication data). This invitation may be in the form of a message displayed on a screen of the terminal, or indeed a voice message issued by the terminal, or a prompt displayed in the user interface deployed by the browser 4, etc.

In this example it is assumed that the user U responds to this invitation by using the terminal 3 (e.g. input via the keyboard of the terminal 3) to supply the application APP1 with authentication data corresponding to the expected portion P-PWD-U of the authentication data (step E90).

The application APP1 evaluates the digital fingerprint EN' of the authentication data input by the user U by making use of the hashing function included in the application APP1. It then compares the digital fingerprint EN' as evaluated in this way with the digital fingerprint EN as stored during generation of the application. On the above assumptions, these two digital fingerprints EN and EN' are identical since the authentication data supplied by the terminal 3 to the application APP1 coincides with the expected portion P-PWD-U used for protecting the application APP1.

As a result, the application APP1 triggers the setting up of a secure connection between the terminal 3 (i.e. the browser 4) and the proxy server 10 making use of the connection parameters defined in the set PC, as mentioned above (step E100). This connection enables the terminal 3 to access the internal network 1 via the firewall 2. The terminal 3 has been correctly authenticated with the secure network 1: the user U of the terminal 3 can now the use the browser 4 to obtain secure access to the facilities made available by the network 1 via the secure connection that has been set up in this way.

In contrast, if the authentication data supplied by the user U via its terminal 3 in response to the invitation from the application APP1 does not coincide with the expected portion P-PWD-U of the authentication data associated with the identifier ID-U that was used for protecting the application APP1, then authentication of the terminal 3 fails.

In the presently-described implementation, the application APP1 is configured in such a manner as to repeat its invitation to the user of the terminal 3 some predefined number of times (e.g. three times) in the event of authentication failing. Once that number is exceeded, and in the absence of the terminal 3 supplying the application APP1 with authentication data that matches the portion P-PWD-U, the application APP1 does not trigger setting up of the secure connection between the terminal 3 and the proxy server 10. In other words, the application APP1 blocks access to the secure network 1 for the terminal 3.

More specifically, in the presently-described implementation, the application APP1 is programmed to delete itself from the browser 4 once the authorized maximum number of authentications has been reached.

In a variant, it is possible to envisage blocking use thereof, or to envisage any other mechanism that makes it possible, potentially permanently, to prevent a connection being set up from the application APP1.

With reference to FIG. 5, there follows a description of the authorization second stage P2 that is performed after authenticating of the terminal 3.

It is assumed that the terminal 3 sends a request R2 via its browser 4 and more precisely via the application APP1 to access the services 5 made available by the service provider 5A hosted in the external network 5 (step F10).

This access request R2 passes via the secure connection previously set up by the application APP1 between the terminal 3 and the proxy server 10, once the terminal 3 has been authenticated. It is thus sent to (or intercepted by) the proxy server 10. In this example, it contains the user identifier ID-U.

The proxy server 10 transfers the request R2 to the identity and access provider 7 (step F20).

On receiving the request R2, the identity and access provider 7 verifies that the terminal 3 is indeed authorized to access the service S5 (step F30).

For this purpose, in the presently-described implementation, it consults the service database 6 and the information stored in the user account in association with the identifier ID-U, and in particular the user group GID5 to which the user U belongs.

The identity and access provider 7 acts in conventional manner on the user group to determine the various access rights that have been allocated to by the administrator (or the operator) of the secure network 1. It thus determines that the user U associated with the identifier IDU has the right to access the service S5.

It should be observed that no limitation is associated with the form of this verification or with the way in which the service access policy defined by the administrator of the network 1 is represented (i.e. directly in the database 6, via an access agent or server, etc.).

The identity and access provider 7 thus obtains from the access base 8 the access parameters required for accessing the service S5 (step F40), specifically in this example; the port PORT5, the address URL5, the address @IP5A, the communication protocols PROT5, and the security token TOKEN1-5 negotiated between the service platform 5A and the entity E1 of the secure network 1.

The identity and access provider 7 then sends a request to the gateway 9 requesting it to generate an application for providing the terminal 3 with access to the requested service S5 (step F50). This request includes the above-mentioned access parameters.

On receiving this request, the gateway 9 generates an application APP2 from the access parameters transmitted by the identity and access provider 7 (step F60). This application APP2 is an active JavaScript® application for executing in the browser 4 of the terminal 3 and for setting up a secure direct connection between the terminal 3 and the platform 5A enabling the user U to access the service 5. By way of example, this application APP2 is a secure shell (SSH) type connector generated from access parameters transmitted by the identity and access provider 7. In particular, it includes a security token TOKEN1-5 enabling the terminal 3 to access the service S5 in the name of the business COMP with which the secure network 1 is attached.

The gateway 9 transmits this application APP2 to the browser 4 (step F70). In the presently-described implementation, the application APP2 is transmitted via the secure connection set up by the application APP1 between the proxy server 10 and the browser 4 of the terminal 3.

The browser 4 executes the application APP2 as received in this way (step F80).

This execution leads to the application APP2 supplying the terminal 3 with a direct connection to the service platform 5A, and correspondingly to the terminal 3 having direct access to the service S5.

More precisely, in the presently-described implementation, the application APP2, on being executed by the browser 4, automatically sets up a secure SSH connection with the service platform 5A identified by its address @IP5A. It also downloads the page identified by the address URL5 where the service S5 is accessible. The security token TOKEN1-5 is also supplied to the service platform 5A in order to enable the user of the terminal 3 to have direct access to the on-line booking service S5 in the name of the business COMP, and without there being any need to supply the authentication data of the account associated with the business by the service provider 5A (step F90).

In the presently-described implementation as shown in FIG. 5, once the terminal 3 has been authenticated in compliance with the authentication method and the connection set-up method of the invention, it has been assumed that this terminal is given access to a service S5 made available by a platform that is external to the internal network 1. Nevertheless, this assumption is not itself limiting: the authentication method and the connection set-up method can also be performed in order to authenticate the terminal 3 upstream from the terminal accessing a service that is internal to the network 1.

In addition, it should be observed that in the above description certain entities of the network 1 such as the identity and access provider 7 and the gateway 9 are described as being distinct functional entities. Nevertheless, those entities may coexist within a single (hardware or software) device or they may be incorporated in devices that are distinct.

The invention claimed is:

1. An authentication method enabling a gateway of an internal network that is protected by an access security entity for securing access to authenticate a terminal provided with a web browser, the method comprising:
    on receiving a request from the web browser of the terminal that includes a user identifier, obtaining authentication data that is associated with said user identifier from a database of the internal network;
    configuring a proxy server to authorize a determined set of connection parameters to access said internal network via the access security entity;
    generating a first application from parameters of said determined set of connection parameters, said first application including a determined portion of said authentication data, said first application being protected using said determined portion of said authentication data and being configured to, on being executed by the web browser of the terminal, set up a connection between said terminal and said proxy server by using said parameters, in response to the first application determining that data supplied to the first application by a user via the terminal corresponds to the at least one determined portion of the authentication data included in the first application; and
    transmitting said first application to the web browser of the terminal.

2. An authentication method according to claim 1, wherein, during the generation of said first application, said determined portion of the authentication data used for protecting the application is determined in a random manner.

3. An authentication method according to claim 1, wherein the first application as generated during the generation step includes said determined portion of the authentication data in protected form.

4. An authentication method according to claim 3, wherein said protected form comprises a digital fingerprint of said determined portion of the authentication data as generated using a hashing function.

5. An authentication method according to claim 1, wherein said first application is in the JavaScript® language.

6. An authentication method according to claim 1, wherein the first application is generated in a manner that triggers deletion of said first application in the event of terminal authentication data that does not correspond to said determined portion of the authentication data used for protecting the first application being supplied in succession some predetermined number of times.

7. The method of claim 1, wherein the terminal is authenticated by the gateway, the method further comprising:
    receiving, by the first application, a request from terminal to access a service made available by a service platform of an external network distinct from the internal network;
    upon a determination that said terminal is authorized to access said service, generating a second application configured to, on being executed by the web browser of the terminal, supply a direct connection between said terminal and said service platform for accessing said service; and
    transmitting said second application to the web browser of the terminal.

8. The method according to claim 7, wherein said second application includes a security parameter previously exchanged between said service platform and an entity of the internal network for accessing said service, said second application being configured to supply the security parameter to said service platform on setting up the direct connection between the terminal and said service platform.

9. The method according to claim 7, wherein the second application is in the JavaScript® language.

10. A computer comprising a processor and a non-transitory memory, the non-transitory memory having stored thereon instructions which, when executed by the processor of the computer, cause the processor to perform the authentication method of claim 1.

11. A non-transitory computer readable data medium having stored thereon instructions, which when executed by a processor, cause the processor to perform the authentication method of claim 1.

12. A connection set-up method for setting up a connection with an internal network protected by an access security entity for providing secure access, said method being for performing by a web browser of a terminal and comprising:
    after said web browser has sent a request including a user identifier to a gateway of the internal network, receiving from said gateway a first application that includes a determined portion of authentication data associated with said user identifier in a database of the internal network, the first application protected using said at least one determined portion of said authentication data; and
    executing said first application, the execution comprising:
        the first application obtaining authentication data from a user via the terminal; and
        if said authentication data obtained from the terminal corresponds to said determined portion of said authentication data protecting the first application and included in the first application, the first application setting up a connection between said terminal and a proxy server, said connection using parameters from a set of connection parameters authorized by said proxy server for accessing said internal network via said access security entity.

13. The method of claim 12, wherein said connection has been set up between said terminal and said proxy server, said method further comprising:
sending, by said first application, a request to the proxy server via said connection, the request being for access to said service made available by said service platform;
if the terminal is authorized to access said service, receiving, by said web browser, a second application generated by the gateway; and
executing said second application, wherein executing said second application supplies the terminal with a direct connection to said service platform to access said service.

14. A gateway of an internal network protected by an access security entity for providing secure access, said gateway configured to:
on receiving a request from a web browser of a terminal that includes a user identifier, obtain authentication data that is associated with the user identifier from a database of the internal network;
configure a proxy server to allow a determined set of connection parameters to access to said internal network via said access security entity;
generate a first application from parameters of said determined set of connection parameters, said application including a determined portion of said authentication data, said first application being protected using said determined portion of said authentication data and being configured to, on being executed by the web browser of the terminal set up a connection between said terminal and said proxy server by using said parameters, in response to said first application determining that data supplied to the first application by a user via the terminal corresponds to the determined portion of the authentication data included in the first application; and
transmit the first application to the web browser of the terminal.

15. A gateway according to claim 14, further configured to:
generate a second application upon a determination that said terminal is authorized to access a service made available by a service platform of an external network distinct from the internal network, said second application being configured to, on being executed by the web browser of the terminal, supply a direct connection between the terminal and said service platform in order to access said service; and
transmit said second application to the web browser of the terminal.

16. An internal telecommunications network protected by an access security entity for providing secure access, said internal network including a gateway according to claim 14 configured to authenticate a terminal, the terminal comprising a web browser configured to:
as a result of said web browser sending a request including a user identifier to the gateway, receive from said gateway the first application; and
execute said first application, wherein executing said first application comprises:
obtaining authentication data from a user via the terminal; and
setting up a connection between said terminal and a proxy server if the authentication data obtained from the user via the terminal corresponds to said determined portion of the authentication data, said connection using parameters of a set of connection parameters authorized by said proxy server to access said internal network via the access security entity.

17. A network according to claim 16, further comprising an access management server configured to verify whether said terminal is authorized to access a service made available by a service platform of an external network distinct from the internal network, and wherein the gateway is further configured to:
generate a second application upon a determination that said terminal is authorized to access a service made available by a service platform of an external network distinct from the internal network, said second application being configured to, on being executed by the web browser of the terminal, supply a direct connection between the terminal and said service platform in order to access said service; and
transmit said second application to the web browser of the terminal;
wherein said first application further comprises a third unit configured to send a request to the proxy server via the connection that has been set up, the request being for access to a service made available by the service platform of the external network, said web browser further configured to:
receive the second application generated by the gateway if the terminal is authorized to access the service; and
execute said second application, said second application being configured to supply the terminal with the direct connection to said service platform in order to access said service.

18. A terminal having a web browser installed thereon, the web browser configured to:
as a result of said web browser sending a request including a user identifier to a gateway of an internal network that is protected by an access security entity, receive from said gateway a first application that includes a determined portion of authentication data associated with said user identifier in a database of the internal network, the first application protected using said determined portion of said authentication data; and
execute said first application, wherein executing said first application comprises:
obtaining authentication data from a user via the terminal; and
setting up a connection between said terminal and a proxy server if the authentication data obtained from the user via the terminal corresponds to said determined portion of the authentication data, said connection using parameters of a set of connection parameters authorized by said proxy server to access said internal network via the access security entity.

19. The terminal according to claim 18, wherein executing said first application further comprises sending a request to the proxy server via the connection that has been set up, the request being for access to a service made available by a service platform of an external network distinct from the internal network, said web browser further configured to:
receive a second application generated by the gateway if the terminal is authorized to access the service; and
execute said second application, said second application being configured to supply the terminal with a direct connection to said service platform in order to access said service.

20. A non-transitory computer readable data medium having stored thereon a software application for execution by a web browser of a terminal, said application including a determined portion of authentication data associated with a user identifier and stored in a database of an internal network protected by an access security entity, the application being protected by said determined portion of said authentication data, said application comprising:

a first unit configured to obtain authentication data from the terminal; and a second unit configured to verify whether said authentication data obtained by the first unit corresponds to the determined portion of the authentication data, and to set up a connection between the terminal and a proxy server associated with the internal network if the authentication data obtained by the first unit corresponds to the determined portion of the authentication data protecting said application, said connection using parameters of a set of connection parameters authorized by the proxy server to access the internal network via the access security entity.

21. A computer comprising a processor and a non-transitory memory, the non-transitory memory having stored thereon a program including instructions which, when executed by the processor of the computer, cause the processor to perform the connection set-up method of claim 12.

22. A computer comprising a processor and a non-transitory memory, the non-transitory memory having stored thereon a program including instructions which, when executed by the processor of the computer, cause the processor to perform the access method of claim 13.

23. A non-transitory computer readable data medium having stored thereon instructions, which when executed by a processor, cause the processor to perform the connection set-up method of claim 12.

24. A non-transitory computer readable data medium having stored thereon instructions, which when executed by a processor, cause the processor to perform the access method of claim 13.

* * * * *